(12) United States Patent
Kim et al.

(10) Patent No.: US 9,531,917 B2
(45) Date of Patent: Dec. 27, 2016

(54) DEVICE AND METHOD FOR EXTRACTING CORRELATION PARAMETERS BETWEEN COLOUR PLANES FOR PREDICTION, AND A RECORDING MEDIUM FOR THE SAME

(75) Inventors: Sunyeon Kim, Seoul (KR); Jeongyeon Lim, Gyeonggi-do (KR); Gyumin Lee, Gyeonggi-do (KR); Jaehoon Choi, Gyeonggi-do (KR); Yoonsik Choe, Gyeonggi-do (KR); Yonggoo Kim, Seoul (KR); Yungho Choi, Gyeonggi-do (KR); Jinwoo Jeong, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 894 days.

(21) Appl. No.: 13/511,336

(22) PCT Filed: Nov. 23, 2010

(86) PCT No.: PCT/KR2010/008298
§ 371 (c)(1),
(2), (4) Date: Aug. 27, 2012

(87) PCT Pub. No.: WO2011/065728
PCT Pub. Date: Jun. 3, 2011

(65) Prior Publication Data
US 2013/0003825 A1 Jan. 3, 2013

(30) Foreign Application Priority Data

Nov. 24, 2009 (KR) .................. 10-2009-0113628
Nov. 18, 2010 (KR) .................. 10-2010-0114812

(51) Int. Cl.
*H04N 1/56* (2006.01)
*H04N 19/61* (2014.01)
(Continued)

(52) U.S. Cl.
CPC .............. *H04N 1/56* (2013.01); *H04N 19/186* (2014.11); *H04N 19/593* (2014.11); *H04N 19/61* (2014.11); *H04N 19/176* (2014.11)

(58) Field of Classification Search
CPC ...... H04N 1/56; H04N 19/186; H04N 19/593; H04N 19/61; H04N 19/176
See application file for complete search history.

(56) References Cited

U.S. PATENT DOCUMENTS 8,126,053 B2 * 2/2012 Song ..................... 375/240.12
8,150,178 B2 * 4/2012 Song ..................... 382/233
(Continued)

FOREIGN PATENT DOCUMENTS

JP    2002-058031    2/2002
JP    2008-278464    11/2008
KR    10-2005-0039057    4/2005

OTHER PUBLICATIONS

International Search Report mailed Aug. 2, 2011 for PCT/KR2010/008298.
(Continued)

*Primary Examiner* — Behrooz Senfi
*Assistant Examiner* — Maria Vazquez Colon
(74) *Attorney, Agent, or Firm* — Hauptman Ham, LLP

(57) ABSTRACT

The present disclosure relates to extracting correlation parameters between color planes for prediction by extracting optimum correlation parameters between the color planes using neighboring blocks when a prediction screen is generated through the use of the correlation between the color planes in video encoding. The technology includes neighboring block searching unit responsive to a second block of a reconstructed previous plane corresponding to a first block to be encoded of a current plane, for searching for a third block belonging to neighboring blocks of the second block and having smallest difference in pixel value from the second block; correlation parameter calculator for calculating correlation parameters between the third block and a fourth block reconstructed of the current plane and corresponding to the third block, based on the third block and the fourth block, and predictor for predicting the first block based on the second block and calculated correlation parameters.

15 Claims, 8 Drawing Sheets

(51) Int. Cl.
*H04N 19/593* (2014.01)
*H04N 19/186* (2014.01)
*H04N 19/176* (2014.01)

(56) References Cited

U.S. PATENT DOCUMENTS

| | | | |
|---|---|---|---|
| 8,331,664 B2 * | 12/2012 | Strom et al. | 382/166 |
| 2008/0166059 A1 * | 7/2008 | Baik et al. | 382/236 |
| 2008/0304759 A1 * | 12/2008 | Lee et al. | 382/238 |
| 2009/0092188 A1 * | 4/2009 | Lee et al. | 375/240.16 |

OTHER PUBLICATIONS

Byung Cheol Song; Yun Gu Lee; and Nak Hoon Kim; "Block Adaptive Inter-Color Compensation Algorithm for RGB 4:4:4 Video Coding"; IEEE CVST; pp. 1447-1451 (5 pgs); vol. 18; No. 10; Oct. 2008.

Yong-Hwan Kim; Byeongho Choi; and Joonki Paik; "High Fidelity RGB Video Coding Using Adaptive Inter-Plane Weighted Prediction"; IEEE CVST; pp. 1051-1056 (6 pgs); vol. 19; No. 7; Jul. 2009.

Sang Heon Lee; Jae Won Moon; Jae Woan Byun; and Nam Ik Cho; "A New Intra Prediction Method Using Channel Correlations for the H.264/AVC Intra Coding"; Picture coding Symposium 2009; Mar. 2009.

\* cited by examiner

DEVICE AND METHOD FOR EXTRACTING CORRELATION PARAMETERS BETWEEN COLOUR PLANES FOR PREDICTION, AND A RECORDING MEDIUM FOR THE SAME

CROSS REFERENCE TO RELATED APPLICATION

This application claims the priority of Korean Patent Application No. 10-2009-0113628, filed on Nov. 24, 2009, and Korean Patent Application No. 10-2010-0114812, filed on Nov. 18, 2010 in the KIPO (Korean Intellectual Property Office). Further, this application is the National Phase application of International Application No. PCT/KR2010/008298 filed Nov. 23, 2010, which designates the United States and was published in Korean.

TECHNICAL FIELD

The present disclosure relates to video data compression technology. More particularly, the present disclosure relates to an apparatus and a method of extracting correlation parameters between color planes for prediction by extracting optimum correlation parameters between the color planes by using neighboring blocks when a prediction screen is generated through the use of the correlation between the color planes in video encoding, and a recording medium is for the same.

BACKGROUND

The statements in this section merely provide background information related to the present disclosure and may not constitute prior art.

In general, all color videos are currently input and output in the RGB format. In other words, all colors may be expressed with colors of Red (R), Green (B), and Blue (B). However, the RGB format has a high correlation between respective color channels, so the compression ratio is low when a video is encoded in the RGB format. Accordingly, a general and common application currently uses a video format of the YCbCr format, not the RGB format, in storage, transmission, and compression of a video. A method of transforming the RGB format to the YCbCr format is defined in an international standard group, such as the International Telecommunication Union (ITU) or the Society of Motion Picture and Television Engineers (SMPTE). In the YCbCr, Y refers to a luminance component and Cb and Cr refer to chrominance components, and the correlation between respective color channels is substantially removed.

Most of the common applications currently use a signal in the 4:2:0 format, as well as the simply transformed YCbCr format. FIG. 1 is a diagram illustrating the YCbCr 4:4:4 format, FIG. 2 is a diagram illustrating the YCbCr 4:4:2 format, and FIG. 3 is a diagram illustrating the YCbCr 4:2:0 format. According to the YCbCr 4:2:0 format, information on chrominance signals, i.e. Cb and Cr, is transversely and longitudinally sub-sampled by ½, so that the information on the chrominance signals is decreased to ¼ as illustrated in FIG. 3. This uses a fact that a person is more sensitive to a luminescence signal than a chrominance signal. Accordingly, most of the current video codecs including MPEG-2/4, H.263, and H.264/MPEG-4 AVC basically encode and decode an input video in the YCbCr 4:2:0 format.

However, in this case, a loss of the chrominance signal of an encoded image is greatly generated compared to an original image. Accordingly, a professional application field, such as a digital cinema, a medical image, and a Ultra High Definition Television (UHDTV), uses the RGB 4:4:4 format or the YCbCr 4:4:4 format, not the YCbCr 4:2:0 format.

In order to support the format, H.264/AVC AMD supports a signal processing in an RGB area with high 4:4:4 intra/predictive profiles, and includes two support methods below. The first method is a common mode method of commonly applying an intra/inter mode, which has been determined at the time of encoding of a green chrominance signal, to a blue and a red in the processing of an RGB signal. The second method is an independent mode method of independently processing each of R, G, and B. In this case, as described above, the compression ratio of an encoded image is deteriorated due to the high correlation between the R, G, and B.

Accordingly, the high correlation between chrominance signals fundamentally exists in the RGB area, so that a research for improving the efficiency of an encoder through the removal of the correlation has been conducted.

Document 1 discloses a method, in which R and B signals are predicted using a G signal based on the fact that the linear relation is represented between R, G, and B signals. An inclination value and an offset value in a linear model are transmitted from an encoder to a decoder, and the decoder predicts the R signal and the B signal by using the G signal based on the transmitted inclination and offset values. Such a method may improve the prediction efficiency, but it is necessary to transmit an inclination value and an offset value for each macro block, so a quantity of side information is increased, causing the performance of the method to be limited.

In order to solve the limitation, Document 2 discloses a method, in which an inclination value and an offset value are estimated in already reconstructed G, R, and B signals for each block, so that it is not necessary to to transmit the inclination value and the offset value. That is, in the method, a decoder estimates an inclination and an offset based on values of samples of a left side and an upper side of an image, so that the encoding efficiency is improved through removal of side information for notifying of the correlation between channels.

Further, Document 3 discloses a researched method of applying a high weight value to a similar pixel when the similar pixel is positioned in a decoding completed adjacent area and a low weight value to an adjacent pixel having a low similarity in generating a currently estimated prediction image of B and R signals. In this case, a reference for determining a similarity between an image to be estimated and a decoding completed image is an already encoding completed G signal.

[Document 1] Byung Cheol Song, Yun Gu Lee, and Nak Hoon Kim"Block Adaptive Inter-Color Compensation Algorithm for RGB 4:4:4 Video Coding," IEEE CVST., vol. 18, no. 10, pp. 1447-1451, October, 2008.

[Document 2] Y.-H. Kim, S.-Y. Jung, B. H. Choi and J. K. Park, "High Fidelity RGB Video coding Using Adaptive Inter-Plane Weighted Prediction," IEEE CVST., vol. 19, No. 7, pp 1051-1056, July, 2009.

[Document 3] S. H. Lee, J. W. Moon, J. W. Byun and N. I. Cho, "A New Intra Prediction Method Using Channel Correlations for The H.264/AVC Intra Coding," Picture coding Symposium 2009. March, 2009.

As described above, the existing researches use an encoded completed green signal for generation of a prediction image for encoding blue and red signals, to obtain an encoding gain.

However, in a case where there are various boundaries and colors inside an image to be estimated and there are also various colors and boundaries in an adjacent area, when a parameter having a minimum error is extracted using all adjacent pixels as described in the existing methods, an incorrect pixel may be used for the estimation of a current block, so that the accuracy of the extracted parameter is deteriorated and thus a problem of failing to generate an accurate estimated image is created.

DISCLOSURE

Technical Problem

Therefore, to solve the above-mentioned problems, the present is disclosure seeks to provide an apparatus and a method of extracting correlation parameters between color planes for prediction, which achieves optimal prediction by extracting optimal correlation parameters between the color planes by using a specific block having the highest similarity to a current block among neighboring blocks, and a recording medium for the same.

SUMMARY

An embodiment of the present disclosure provides an apparatus for extracting correlation parameters between color planes for prediction, the apparatus including: a neighboring block searching unit responsive to a second block of a reconstructed previous plane corresponding to a first block to be encoded of a current plane, for searching for a third block belonging to neighboring blocks of the second block and having a smallest difference in pixel value from the second block; a correlation parameter calculator for calculating correlation parameters between the third block and a fourth block reconstructed of the current plane and corresponding to the third block, based on the third block and the fourth block, and a predictor for predicting the first block based on the second block and calculated correlation parameters. The neighboring block searching unit may search for the third block based on a Sum of Absolute Difference (SAD) method, and the correlation parameter calculator may calculate parameters according to a Mean Square Error (MSE) method for making an MSE between the third block and the fourth block have a minimum value, as the correlation parameters.

Another embodiment of the present disclosure provides a method for extracting correlation parameters between color planes for prediction, the method including: searching for a second block of a reconstructed previous plane corresponding to a first block to be encoded of a current plane; searching for a third block belonging to neighboring blocks of the second block and having a smallest difference in pixel value from a second block; searching for the third is block and a fourth block reconstructed of the current plane and corresponding to the third block; calculating correlation parameters between the third block and the fourth block; and predicting the first block based on the second block and calculated correlation parameters. In addition, the third block may be searched for based on an SAD method, and parameters may be calculated according to a Mean Square Error (MSE) method for making an MSE between the third block and the fourth block have a minimum value, as the correlation parameters according to an MSE method.

Yet another embodiment of the present disclosure provides a non-transitory computer readable medium storing a computer program for causing, when executed in a processor, the processor to perform the method for extracting the correlation parameters between the color planes for prediction.

Advantageous Effects

According to the various embodiments of the present disclosure as described above, optimal correlation parameters between color planes is extracted by using a specific block having the highest similarity to a current block among neighboring blocks and optimal prediction is performed on a current block based on the extracted optimal correlation parameters, so that the accuracy of the parameter is improved, an accurate estimated image is generated based on the improved accuracy of the parameter, and the coding efficiency is improved through the decrease of a quantity of side information.

That is, when an input video in the RGB format and YcbCr 4:4:4 format is coded according to the embodiment of the present disclosure, an accurate prediction image is generated by selecting an optimal block which is most similar to a current block from neighboring blocks, so that the compression ratio is improved and a deterioration of image quality is mitigated, and further the optimal block is searched for through a simple search by using the SAD and a prediction is performed between chrominance signals, so that a more efficient inter prediction may be performed without the addition of side information.

DETAILED DESCRIPTION

Figure 1:
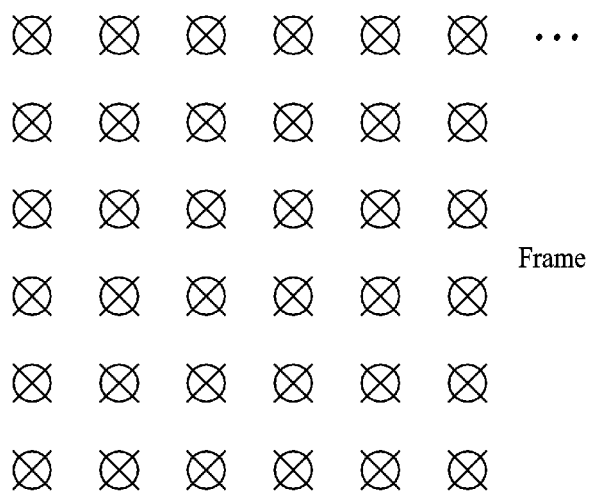
FIGS. 1 to 3 are diagrams illustrating the YCbCr 4:4:4 format, the YCbCr 4:4:2 format, and the YCbCr 4:2:0 format, respectively.
Figure 2:
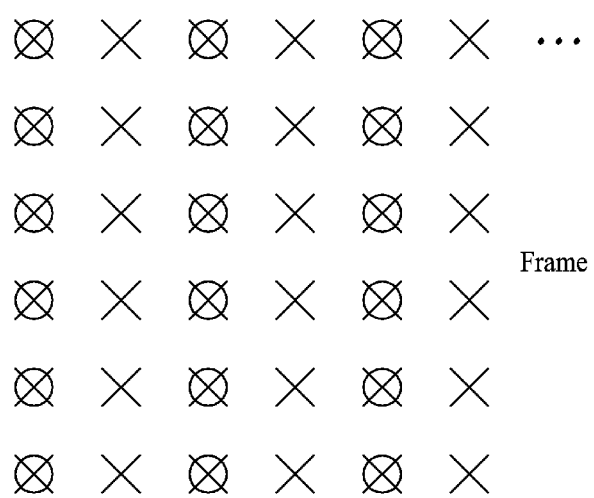
Figure 3:
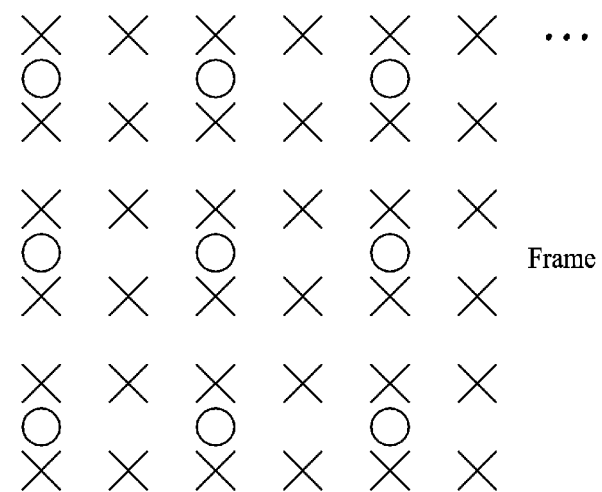

Hereinafter, embodiments of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 4:
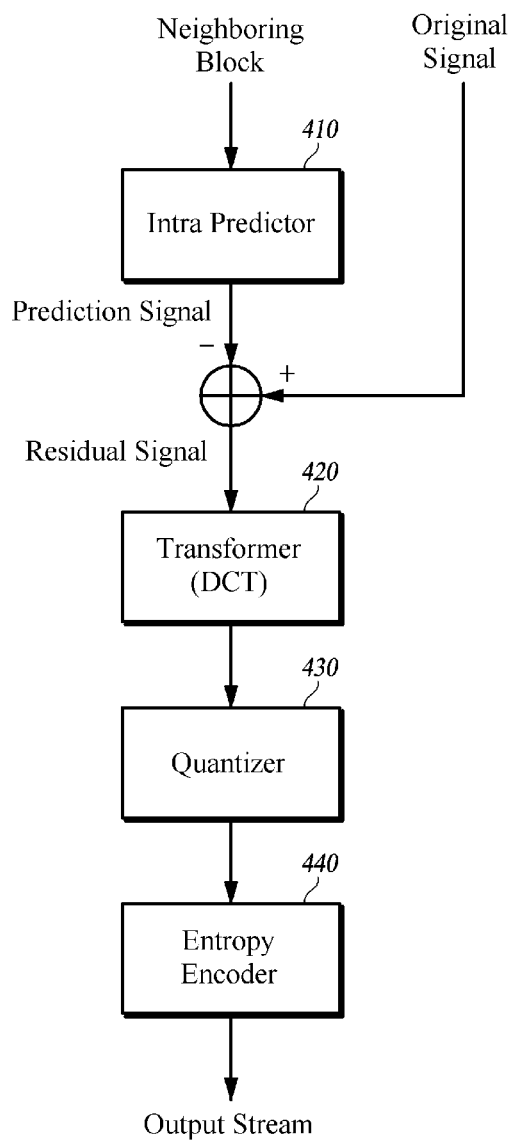
FIG. 4 is a diagram schematically illustrating a basic plane encoder.

FIG. 4 is a diagram schematically illustrating a basic plane encoder. The basic plane encoder (or reconstructed previous plane) includes an intra predictor 410, a transformer 420, a quantizer 430, and an entropy encoder 440, and independently encodes the basic plane regardless of other planes. The basic plane is generated by the basic plane encoder of FIG. 4, and then other planes, except for the basic plane, are encoded using an encoder for performing encoding including inter plane prediction of FIG. 5 by using the generated basic plane.

Figure 5:
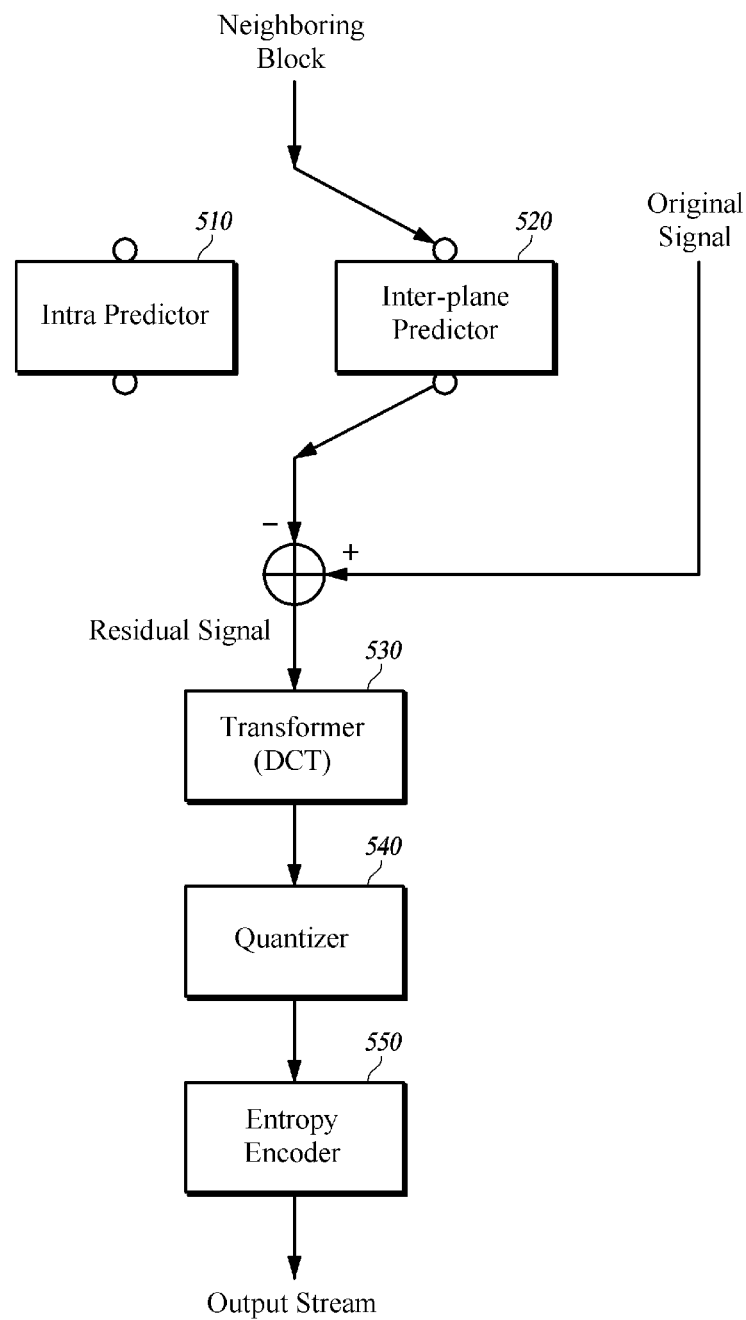
FIG. 5 is a diagram schematically illustrating an encoder for performing encoding including inter plane prediction.

FIG. 5 is a block diagram for schematically illustrating the encoder for performing encoding including inter-plane prediction. The encoder includes an intra predictor 510, an inter plane predictor 520, a transformer 530, a quantizer 540, and an entropy encoder 550. Here, the inter plane predictor 520 includes an apparatus for extracting correlation parameters between color planes for prediction as suggested in the present disclosure, and has a neighboring block and the basic plane as an input. In FIG. 5, the encoder performs intra prediction and inter plane prediction, and then predicts a current block with the appropriate prediction method between the intra prediction and the inter plane prediction. Information on the prediction which has been used between the intra prediction and the inter plane prediction is signaled and transmitted. Then, a residual is signal which is a difference between a predicted signal and an original signal is transformed, quantized, and entropy encoded by the transformer 530, the quantizer 540, and the entropy encoder 550, so that an output stream is finally generated.

In decoding, an image may be reconstructed by inversely performing the processes of the aforementioned encoder.

Figure 6:
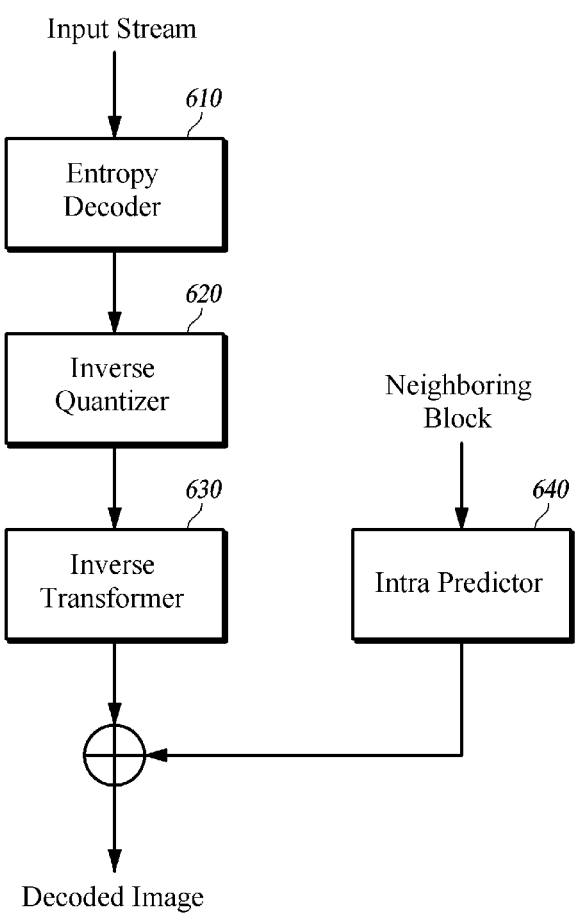
FIG. 6 is a diagram schematically illustrating an apparatus for decoding a basic plane.

FIG. 6 is a diagram schematically illustrating a basic plane decoder. The basic plane decoder includes an entropy decoder 610, an inverse quantizer 620, an inverse transformer 630, an intra predictor 640, and independently decodes the basic plane regardless of other planes. The basic plane is generated using the basic plane decoder of FIG. 6, and then other planes, except for the basic plane, is decoded using a decoder for performing decoding including inter plane prediction of FIG. 7 by using the generated basic plane.

Figure 7:
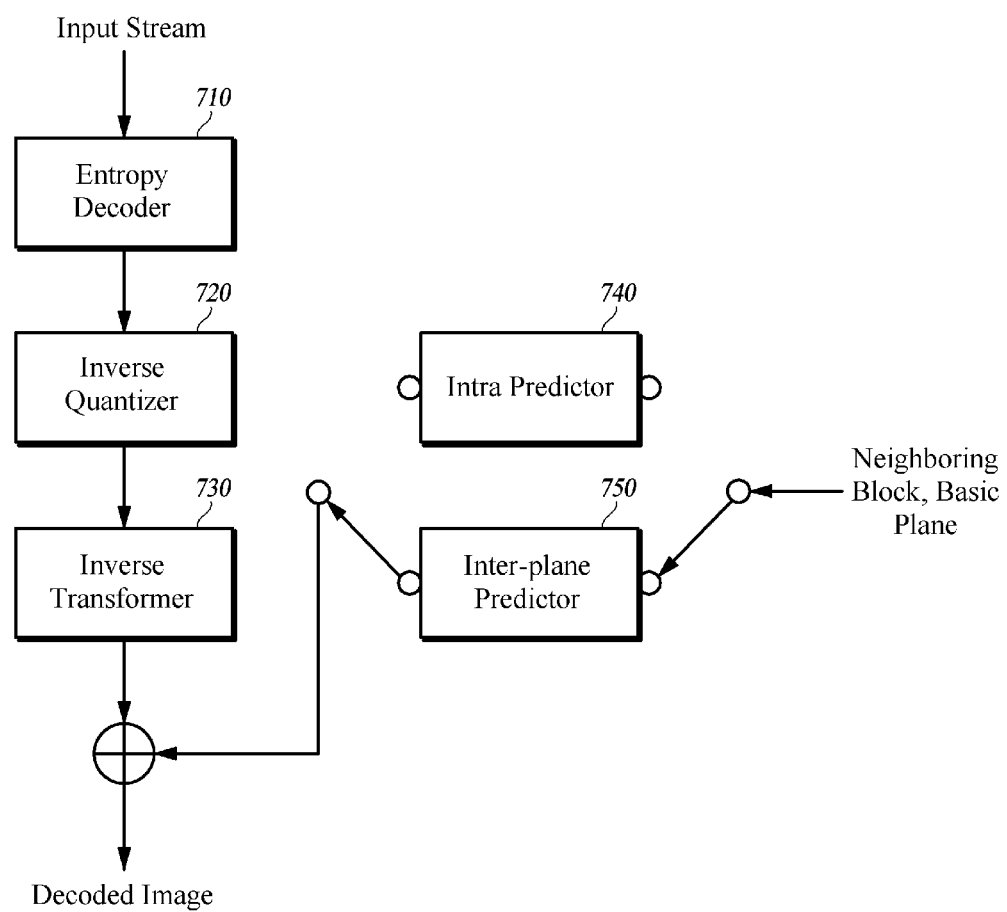
FIG. 7 is a diagram schematically illustrating a decoder for performing decoding including inter plane prediction.

FIG. 7 is a diagram for schematically illustrating the decoder for performing decoding including inter-plane prediction. The decoder includes an entropy decoder 710, an inverse quantizer 720, an inverse transformer 730, an intra predictor 740, and an inter plane predictor 750. Here, the inter plane predictor 750 includes the apparatus for extracting correlation parameters between color planes for prediction as suggested in the present disclosure, and has a neighboring block and a basic plane as an input. In FIG. 7, the decoder performs prediction with the prediction method signaled in the input stream between the intra prediction and the inter plane prediction. Then, the decoder adds a prediction image to a decoded residual image, to finally generate a decoded image.

Figure 8:
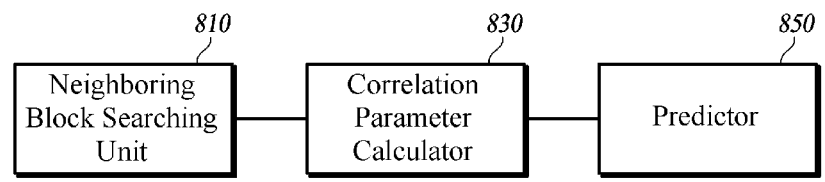
FIG. 8 is a block diagram illustrating an apparatus for extracting correlation parameters between color planes for prediction according to an embodiment of the present disclosure.

FIG. 8 is a block diagram illustrating the apparatus for extracting correlation parameters between color planes for prediction according to an embodiment of the present disclosure. The apparatus includes a neighboring block searching unit 810, a correlation parameter calculator 830, and a predictor 850 as illustrated in FIG. 8.

The neighboring block searching unit 810 searches for a third block (e.g. block X' of FIG. 10A) having the smallest difference in a pixel value from a pixel value of the second block in neighboring blocks of the second block (block X), and then searches for a reconstructed fourth block (e.g. block Y of FIG. 10B) of the current plane corresponding to the third block (block X'), for a second block (e.g. block X of FIG. 10A) of a reconstructed previous plane (or a basic plane) (see FIG. 10A) corresponding to a first block (e.g. block Y of FIG. 10B) to be encoded of a current plane (see FIG. 10B).

Figure 11:
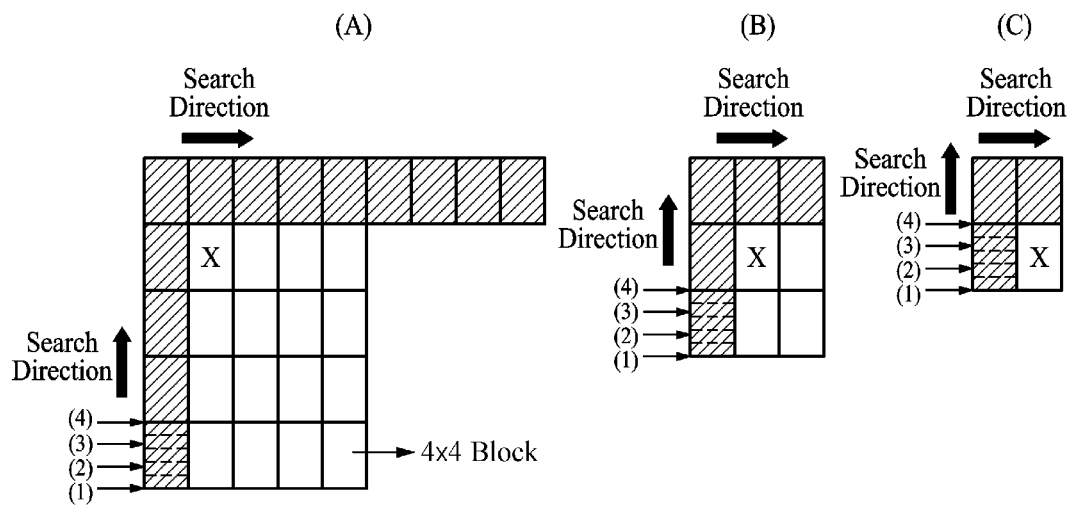
FIGS. 11A to 11C illustrate a search direction and a search region according to an embodiment of the present disclosure.

According to the present embodiment, the neighboring blocks of the second block (block X) are hatched blocks illustrated in FIGS. 11A, 11B, and 11C. When an encoding unit is the unit of 16×16 blocks as illustrated in FIG. 11A, a plurality of 4×4 blocks adjacent to a left side, an upper side, and a right-upper side of corresponding 16×16 blocks may be set as the neighboring blocks. When an encoding unit is the unit of 8×8 blocks as illustrated in FIG. 11B, five 4×4 blocks adjacent to a left side and an upper side of corresponding 8×8 blocks may be set as the neighboring blocks. When an encoding unit is the unit of 4×4 blocks as illustrated in FIG. 11C, three 4×4 blocks adjacent to a left side, a left-upper side, and an upper side of corresponding 4×4 blocks may be set as the neighboring blocks. However, the neighboring blocks are not limited thereto. The neighboring block searching unit 810 may sequentially search for set neighboring blocks in a direction from a left-lower side, a left-upper side, to a right-upper side based on a Sum of Absolute Difference (SAD) method as illustrated in FIG. 11, and find the third block (block X') having the smallest value of the SAD as a result of the search.

The correlation parameter calculator 830 calculates correlation parameters between the third block (block X') and the fourth block (block Y) based on the third block (block X') and the fourth block (block Y) corresponding to the third block (block X'). For example, the correlation parameter calculator 830 may calculate parameters making a Mean Square Error (MSE) between the to third block (block X') and the fourth block (block Y) have a minimum value according to the MSE method as the correlation parameters.

The predictor 850 may generate a prediction block of the first block (block Y) based on the second block (block X) and the correlation parameters calculated by the correlation parameter calculator 830.

Figure 9:
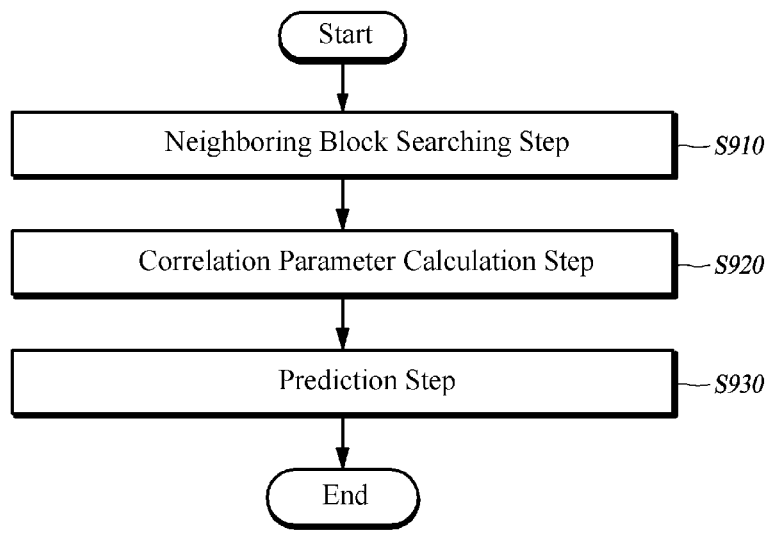
FIG. 9 is a flowchart illustrating a method of extracting correlation parameters between color planes for prediction according to an embodiment of the present disclosure.

FIG. 9 is a flowchart illustrating a method of extracting correlation parameters between color planes for prediction according to an embodiment of the present disclosure. As illustrated in FIG. 9, the method includes a neighboring block searching step (S950), a correlation parameter calculation step (S930), and a prediction step (S950). The method may be applied to the apparatus of FIG. 4, so that it will be described along with the operation of the apparatus.

Neighboring Block Searching Step (S910)

When one of a red plane or a blue plane illustrated in FIG. 10B is a current plane to be encoded and a green plane illustrated in FIG. 10A is a basic plane as a previous plane reconstructed after encoding, the neighboring block searching unit 810 searches for a second block (block X) of a reconstructed previous plane corresponding to a first block (block Y) to be encoded of the current plane, searches for a third block (e.g. block X') having the smallest difference in a pixel value from a pixel value of the second block (block X) in the neighboring blocks (hatched blocks of FIG. 11) of the second block (block X) according to the SAD method, and searches for a reconstructed fourth block (block Y) of the current plane corresponding to the found third block (block X').

Correlation Parameter Calculation Step (S930)

Subsequently, the correlation parameter calculator 830 calculates linear correlation parameters between the third block (block X') and the fourth block (block Y) based on the pixel value of the third block (block X') and a pixel value of the fourth block (block Y). For example, the correlation parameter calculator 830 may calculate parameters making an MSE value between the third block (block X') and the fourth block (block Y) have a minimum value as the correlation parameters according to the MSE method.

Prediction Step (S950)

Last, the predictor 450 generates a prediction block of the first block (block Y) based on the second block (block X) and the correlation parameters calculated by the correlation parameter calculator 830.

Next, a specific operation of the apparatus of FIG. 8 will be described along with a specific process of the method of FIG. 9.

The embodiment of the present disclosure is applied to extraction of correlation parameters necessary for performing linear transform of other planes when a prediction screen (or image or block) of the other planes is generated by linearly transforming the other planes based on a basic plane in encoding the other planes after encoding of the basic plane. Generally, the basic plane is a green plane, and the different planes are a red plane and a blue plane. The aforementioned prediction method applied to the embodiment of the present disclosure is called inter plane prediction or inter color prediction. For convenience of description, the encoding is performed in an order of a green signal, a blue signal, and a red signal according to the embodiment of the present disclosure, but the order is not limited thereto, and may be changed. According to the embodiment of the present disclosure, the prediction in the unit of blocks is performed in order to predict a blue signal and a red signal by using a green plane.

Figure 10:
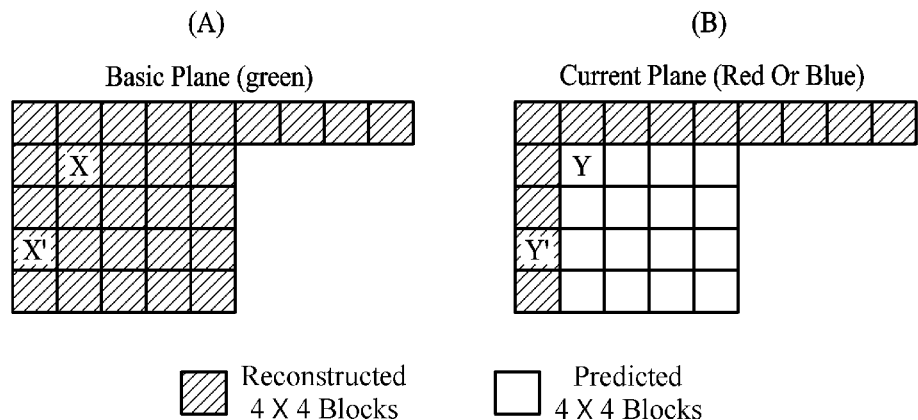
FIGS. 10A and 10B illustrate a relation between a current plane and a reconstructed plane according to an embodiment of the present disclosure.

As illustrated in FIG. 10, when block Y of the current plane is predicted using block X of the basic plane, the prediction screen may be obtained based on Equation 1 by the predictor 850 or in the prediction step (S950).

$$\hat{Y} = wX + o \qquad \text{Equation 1}$$

$\hat{Y}$ is a value of the prediction screen which is linearly predicted using block X, and is used for prediction of block Y.

In the present embodiment, when the basic plane is a green plane and a plane to be predicted is a blue plane, Equation 1 may be expressed as Equation 2 again.

$$\hat{B}_P(i,j) = \alpha_B \times G'(i,j) \beta_B \qquad \text{Equation 2}$$

G'(i, j) represents a pixel value of the reconstructed green plane, i and j represent positions of pixels and $\hat{B}_P(i, j)$ refers to a pixel value of the predicted blue plane.

In order to perform the prediction based on Equation 2 by the predictor 850 or in the prediction step (S950), linear correlation parameters $\alpha_B$ and $\beta_B$ are necessary.

The correlation parameters are not directly transmitted in the encoding step, but are searched for using pixels of reconstructed neighboring blocks for the current block of the current blue plane and pixels of reconstructed neighboring blocks of the green plane corresponding to the current block of the current blue plane in the neighboring block searching unit 810 or in the neighboring block searching step (S910).

Specifically, in order to search for the two correlation parameters in the neighboring block searching unit 810 or in the neighboring block searching step (S910), a block which is the most similar to the green block (block X) positioned at a corresponding position of the blue block (block Y) to be currently encoded is searched for in the neighboring blocks (see FIGS. 11A to 11C) of an adjacent area. The SAD used for the search of current motion is applied to the search as expressed in Equation 3, but the search is not limited thereto.

$$SAD(m, n)_G = \sum_{x=0, y=0}^{M-1, N-1} |G'(x, y) - G'(x-m, y-n)| \qquad \text{Equation 3}$$

In Equation 3, G'(x,y) represents a pixel value of block X, and G'(x−m,y−n) represents a pixel value of a neighboring block changed from block X by (m,n).

In the correlation parameter calculator 830 or in the correlation parameter calculation step (S930), a block having the smallest SAD value is searched in the neighboring blocks and the found block is determined as a block (it is assumed as block X') for searching for optimal correlation parameters, and the correlation parameters $\alpha_B$ and $\beta_B$ are calculated using determined block X' and the correlation between green and blue at a position of block Y' corresponding to determined block X'. In Equation 4, m* and n* represent coordinates having an optimal position, i.e. coordinates of pixels of block X', and are calculated by the correlation parameter calculator 430 or in the correlation parameter calculation step (S930).

$$m^*, n^* = \arg\min_{m,n} SAD(m, n)_{G'} \qquad \text{Equation 4}$$

In the correlation parameter calculator 430 or in the correlation parameter calculation step (S930), the correlation parameters are calculated based on the found block and obtained by Equations 5 and 6. The correlation parameters are parameters making an MSE value between block X' and block Y' have a minimum value in the MSE embodiment. In Equations 5 and 6, M and N represent the number of pixels in an X-axis and an Y-axis of a corresponding block, respectively, G'(i−m*,j−n*) represents a pixel value of block X', and B'(i−m*, j−n*) represents a pixel value of block $$\alpha_B = \frac{MN \sum_{i=0,j=0}^{M-1,N-1} (B'(i-m^*, j-n^*) \times G'(i-m^*, j-n^*)) - \sum_{i=0,j=0}^{M-1,N-1} G'(i-m^*, j-n^*) \sum_{i=0,j=0}^{M-1,N-1} B'(i-m^*, j-n^*)}{MN \sum_{i=0,j=0}^{M-1,N-1} (G'(i-m^*, j-n^*))^2 - \left(\sum_{i=0,j=0}^{M-1,N-1} G'(i-m^*, j-n^*)\right)^2} \qquad \text{Equation 5}$$

$$\beta_B = \frac{1}{MN} \left( \sum_{i=0,j=0}^{M-1,N-1} B'(i-m^*, j-n^*) - \alpha_B \sum_{i=0,j=0}^{M-1,N-1} G'(i-m^*, j-n^*) \right) \qquad \text{Equation 6}$$

In the predictor 850 or the prediction step (S950), the blue plane is predicted in an already decoded green plane, and a prediction image $\hat{B}_P(i,j)$ is generated by substituting the correlation parameters $\alpha_B$ and $\beta_B$ obtained in the correlation parameter calculator 430 or the correlation parameter calculation step (S930) to Equation 2.

In the embodiment of the present disclosure, an example of an area of the neighboring blocks in which the similar block is searched is as illustrated in FIGS. 11A to 11C. In order to prevent the increase of the calculation for the blocks having a size of 16×16, 8×8, and 4×4 used for encoding a video, a search area is minimized in the unit of, for example, 4×4 blocks. Specifically, the similar block is searched for while moving in the unit of pixels only in the area of 4×4 blocks that is the minimum unit of blocks for searching in the areas of a left side, an upper side, and a right-upper side of the area to be encoded.

Through application of the aforementioned method in the same manner, the red plane is also encoded. However, when the blue plane is encoded, the usable chrominance information is only the green plane. However, when an information on the red plane is encoded, the blue plane has been completely encoded, so that an information on the blue plane may be used for the aforementioned inter plane prediction.

Referring to FIG. 9, the method of extracting the correlation parameters between the color planes for the prediction according to the embodiment of the present invention may be implemented by a computer readable recording medium including program commands for performing various operations executed by a computer. The computer readable recording medium may include separate or a combination of program commands, a local data file, a local data structure, etc. The computer readable recording medium is specially designed and configured for the embodiment of the present invention, but may be publicly known to and available to one skilled in the computer software field. An example of the computer readable recording medium includes a magnetic medium including a hard disk, a floppy disk, and a magnetic disk, an optical recording medium including CD-ROM and DVD, a magnetic-optical medium including a floptical disk, and a hardware device including ROM, RAM, and flash memory specially configured for storage and execution of program commands. The computer readable recording medium may be a transmission medium, such as optical or metal lines and a waveguide including a carrier for transmitting a signal designating a program command, a local data structure, etc. An example of the program command may include a high-level language code executable by a computer by using an interpreter, etc., as well as a mechanical code created by to a complier.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the embodiments of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary embodiments of the present disclosure have been described for illustrative purposes, those skilled in the art will appreciate that various modifications, additions and substitutions are possible, without departing from essential characteristics of the disclosure. Therefore, exemplary embodiments of the present disclosure have not been described for limiting purposes. Accordingly, the scope of the disclosure is not to be limited by the above embodiments but by the claims and the equivalents thereof.

INDUSTRIAL APPLICABILITY

As described above, the present disclosure is highly useful for application in the fields of video data compression technology, and especially the present disclosure is applied to the inter plane prediction so that optimal correlation parameters between color planes are extracted from neighboring blocks by using a specific block having the highest similarity to a current block and an optimal prediction is performed on the current block based on the extracted optimal correlation parameters, thereby improving the accuracy of the parameters, generating an accurate estimated image according to the accurate parameters, and improving the coding efficiency through the decrease of side information.

The invention claimed is:

1. An apparatus for predicting a first block of a current plane by using correlation parameters between color planes, the apparatus comprising:
   a neighboring block searching unit configured to
      search for a second block in a reconstructed previous plane based on a location of the first block in the current plane, wherein a position of the second block in the reconstructed previous plane is same as the location of the first block in the current plane, and
      select a third block among neighboring blocks of the second block in the reconstructed previous plane, wherein a pixel value difference between the second block and the third block is a minimum among respective pixel value differences between the second block and respective neighboring blocks of the second block;
   a correlation parameter calculator configured to
      search for a fourth block in the current plane based on a location of the third block in the reconstructed previous plane, wherein a position of the fourth block in the current plane is same as the location of the third block in the reconstructed previous plane,
      calculate the correlation parameters between the third block and the fourth block; and
   a predictor configured to predict the first block based on the second block and the correlation parameters,
   wherein the first block includes a plurality of pixels, and wherein the first block, the second block, the third block and the fourth block are same each other in both size and shape.

2. The apparatus of claim 1, wherein the neighboring block searching unit is configured to select the third block based on a Sum of Absolute Difference (SAD) method.

3. The apparatus of claim 1, wherein the correlation parameter calculator is configured to calculate the correlation parameters to minimize a Mean Square Error (MSE) between the third block and the fourth block.

4. The apparatus of claim 1, wherein the correlation parameter calculator is configured to calculate the correlation parameters according to the following equations, $$\alpha_B = \frac{MN \sum_{i=0,j=0}^{M-1,N-1} (B'(i-m^*, j-n^*) \times G'(i-m^*, j-n^*)) - \sum_{i=0,j=0}^{M-1,N-1} G'(i-m^*, j-n^*) \sum_{i=0,j=0}^{M-1,N-1} B'(i-m^*, j-n^*)}{MN \sum_{i=0,j=0}^{M-1,N-1} (G'(i-m^*, j-n^*))^2 - \left(\sum_{i=0,j=0}^{M-1,N-1} G'(i-m^*, j-n^*)\right)^2}$$

$$\beta_B = \frac{1}{MN} \left( \frac{\sum_{i=0,j=0}^{M-1,N-1} B'(i-m^*, j-n^*) - \alpha_B}{\sum_{i=0,j=0}^{M-1,N-1} G'(i-m^*, j-n^*)} \right),$$

wherein the correlation parameters are linear parameters including a coefficient $\alpha_B$ and a constant $\beta_B$,
where
M and N represent numbers of pixels in an X-axis and an Y-axis of a corresponding block, respectively,
G'(i−m*, j−n*) represents a pixel value of the third block, and
B'(i−m*, j−n*) represents a pixel value of the fourth block.

5. The apparatus of claim 4, wherein the predictor is configured to predict the first block according to the following equation, $$\hat{B}_P(i,j) = \alpha_B \times G'(i,j)\beta_B,$$

where G'(i, j) represents a pixel value of the second block and $\hat{B}_P(i, j)$ represents a pixel value of the predicted first block.

6. A method for predicting a first block of a current plane prediction by using correlation parameters between color planes, the method comprising:
searching for a second block in a reconstructed previous plane based on a location of the first block in the current plane, wherein a position of the second block in the reconstructed previous plane is same as the location of the first block in the current plane;
select a third block among neighboring blocks of the second block in the reconstructed previous plane, wherein a pixel value difference between the second block and the third block is a minimum among respective pixel value differences between the second block and respective neighboring blocks of the second block;
searching for a fourth block in the current plane based on a location of the third block in the reconstructed previous plane, wherein a position of the fourth block in the current plane is same as the location of the third block in the reconstructed previous plane;
calculating the correlation parameters between the third block and the fourth block; and
predicting the first block based on the second block and the correlation parameters,
wherein the first block includes a plurality of pixels,
wherein the first block, the second block, the third block and the fourth block are same each other in both size and shape.

7. The method of claim 6, wherein the third block is selected based on a Sum of Absolute Difference (SAD) method.

8. The method of claim 6, wherein the correlation parameters are calculate to minimize a Mean Square Error (MSE) between the third block and the fourth block.

9. The method of claim 6, wherein the correlation parameters are calculated according to following equations, $$\alpha_B = \frac{MN \sum_{i=0,j=0}^{M-1,N-1} (B'(i-m^*, j-n^*) \times G'(i-m^*, j-n^*)) - \sum_{i=0,j=0}^{M-1,N-1} G'(i-m^*, j-n^*) \sum_{i=0,j=0}^{M-1,N-1} B'(i-m^*, j-n^*)}{MN \sum_{i=0,j=0}^{M-1,N-1} (G'(i-m^*, j-n^*))^2 - \left(\sum_{i=0,j=0}^{M-1,N-1} G'(i-m^*, j-n^*)\right)^2}$$

$$\beta_B = \frac{1}{MN} \left( \frac{\sum_{i=0,j=0}^{M-1,N-1} B'(i-m^*, j-n^*) - \alpha_B}{\sum_{i=0,j=0}^{M-1,N-1} G'(i-m^*, j-n^*)} \right)$$

wherein the correlation parameters are linear parameters including a coefficient $\alpha_B$ and a constant $\beta_B$,
where M and N represent numbers of pixels in an X-axis and an Y-axis of a corresponding block, respectively,
G'(i−m*, j−n*) represents a pixel value of the third block, and B'(i−m*, j−n*) represents a pixel value of the fourth block.

10. The method of claim 9, wherein the predicted first block is calculated according to a following equation, $$\hat{B}_P(i,j) = \alpha_B \times G'(i,j)\beta_B,$$

where G'(i, j) represents a pixel value of the second block and $\hat{B}_P(i, j)$ represents a pixel value of the predicted first block.

11. A non-transitory computer readable medium comprising a computer program for causing, when executed in a processor, the processor to perform the method of claim 6.

12. A video encoding apparatus, comprising:
an intra predictor configured to perform an intra prediction on a previous plane;
an inter plane predictor configured to
search for a second block in the previous plane based on a location of a first block in a current plane, wherein a position of the second block in the previous plane is same as the location of the first block in the current plane,
select a third block among neighboring blocks of the second block in the previous plane, wherein a pixel value difference between the second block and the third block is a minimum among respective pixel value differences between the second block and respective neighboring blocks of the second block,
search for a fourth block in the current plane based on a location of the third block in the previous plane, wherein a position of the fourth block in the current plane is same as the location of the third block in the previous plane,
calculate correlation parameters between the third block and the fourth block, and
predict the first block according to the second block and the correlation parameters;
a transformer configured to transform to a residual signal representing a difference between the predicted first block and the first block;
a quantizer configured to quantize the residual signal; and
an entropy encoder configured to perform entropy encoding of the quantized signal from the quantizer,
wherein the first block includes a plurality of pixels, and
wherein the first block, the second block, the third block and the fourth block are same each other in both size and shape.

13. A video encoding method, comprising:
performing an intra prediction on a previous plane;
searching for a second block in the previous plane based on a location of a first block in a current plane, wherein a position of the second block in the previous plane is same as the location of the first block in the current plane;
selecting a third block among neighboring blocks of the second block in the previous plane, wherein a pixel value difference between the second block and the third block is a minimum among respective pixel value differences between the second block and respective neighboring blocks of the second block;
searching for a fourth block in the current plane based on a location of the third block in the previous plane, wherein a position of the fourth block in the current plane is same as the location of the third block in the previous plane;
calculating correlation parameters between the third block and the fourth block;
predicting the first block according to the second block and the correlation parameters;
transforming a residual signal representing a difference between the predicted first block and the first block;
quantizing the residual signal; and
performing entropy encoding of the quantized signal,
wherein the first block includes a plurality of pixels,
wherein the first block, the second block, the third block and the fourth block are same each other in both size and shape.

14. A video decoding apparatus, comprising:
a basic plane decoder configured to decode a previous plane regardless of other color planes;
an entropy decoder configured to decode an entropy signal from a bitstream;
an inverse quantizer configured to inversely quantize a decoded entropy signal;
an inverse transformer configured to generate a residual signal by inversely transforming an inversely quantized signal;
a predictor configured to perform inter plane prediction based on a signal extracted from the bitstream; and
an adder configured to generate a decoded image by adding the residual signal to a prediction image obtained by the predictor,
wherein the predictor is further configured to
search for a second block in the previous plane based on a location of a first block in a current plane, wherein a position of the second block in the previous plane is same as the location of the first block in the current plane,
select a third block among neighboring blocks of the second block in the previous plane, wherein a pixel value difference between the second block and the third block is a minimum among respective pixel value differences between the second block and respective neighboring blocks of the second block,
search for a fourth block in the current plane based on a location of the third block in the previous plane, wherein a position of the fourth block in the current plane is same as the location of the third block in the previous plane,
generate correlation parameters between the third block and the fourth block, and
predict the first block according to the second block and the correlation parameters to thereby generate the prediction image,
wherein the first block includes a plurality of pixels,
wherein the first block, the second block, the third block and the fourth block are same each other in both size and shape.

15. A video decoding method, comprising:
decoding a previous plane irrespective of other color planes;
decoding an entropy signal from a bitstream;
inversely quantizing a decoded entropy signal;
generating a residual signal by inversely transforming an inversely quantized signal;
performing inter plane prediction based on a signal extracted from the bitstream; and
generating a decoded image by adding the residual signal to a prediction image obtained in the performing of the inter plane prediction,
wherein the performing of the inter plane prediction further comprises,
searching for a second block in the previous plane based on a location of a first block in a current plane, wherein a position of the second block in the previous plane is same as the location of the first block in the current plane,
selecting a third block among neighboring blocks of the second block in the previous plane, wherein a pixel value difference between the second block and the third block is a minimum among respective pixel value differences between the second block and respective neighboring blocks of the second block,
searching for a fourth block in the current plane based on a location of the third block in the previous plane, wherein a position of the fourth block in the current plane is same as the location of the third block in the previous plane,
generating correlation parameters between the third block and the fourth block, and predicting the first block according to the second block and the correlation parameters to thereby generate the prediction image,
wherein the first block includes a plurality of pixels, and
wherein the first block, the second block, the third block and the fourth block are same each other in both size and shape.

* * * * *